(12) United States Patent
Remoué

(10) Patent No.: US 8,517,118 B2
(45) Date of Patent: *Aug. 27, 2013

(54) STACK-FOLD IMPLEMENT HAVING BULK FILL SYSTEM

(75) Inventor: Tyler Remoué, Rockglen (CA)

(73) Assignee: CNH Canada, Ltd. (CA)

( * ) Notice: Subject to any disclaimer, the term of this patent is extended or adjusted under 35 U.S.C. 154(b) by 382 days.

This patent is subject to a terminal disclaimer.

(21) Appl. No.: 12/827,365

(22) Filed: Jun. 30, 2010

(65) Prior Publication Data

US 2012/0000404 A1 Jan. 5, 2012

(51) Int. Cl.
*A01B 63/32* (2006.01)
*E06C 5/04* (2006.01)
*E06C 5/24* (2006.01)

(52) U.S. Cl.
USPC ........... 172/311; 172/456; 172/662; 172/776; 182/127

(58) Field of Classification Search
USPC ............ 172/310, 311, 456, 630, 632, 633, 172/662, 459, 776; 111/57, 62; 182/127
See application file for complete search history.

(56) References Cited

U.S. PATENT DOCUMENTS

| | | | |
|---|---|---|---|
| 4,202,283 A | 5/1980 | Wiesboeck | |
| 4,558,882 A | 12/1985 | Fuss et al. | |
| 4,611,545 A | 9/1986 | Nickeson et al. | |
| 5,178,328 A | 1/1993 | Broyhill | |
| 5,485,797 A | 1/1996 | Green et al. | |
| 5,809,914 A | 9/1998 | Follmer | |
| 6,092,609 A | 7/2000 | Jeffery et al. | |
| 6,935,254 B2 | 8/2005 | Ostrander et al. | |
| 7,086,342 B2 | 8/2006 | O'Neall et al. | |
| 2007/0256894 A1 * | 11/2007 | Horn et al. | 182/127 |

FOREIGN PATENT DOCUMENTS

| | | |
|---|---|---|
| DE | 4315343 A1 | 11/1993 |
| DE | 19833691 A1 | 1/2000 |
| FR | 2901453 A1 | 11/2007 |

* cited by examiner

*Primary Examiner* — Christopher J Novosad
(74) *Attorney, Agent, or Firm* — Rebecca Henkel

(57) ABSTRACT

A stack-fold implement having a central bulk fill hopper assembly is provided. The bulk fill hopper assembly is mounted to the center frame section of the stack-fold implement and does not affect the narrowness of the stack-fold implement when it's in a stacked, transport position. The hopper assembly includes a pair of bulk fill hoppers or tanks supported by cradle that is in turn supported by a pair of wheels. The cradle is removably coupled to the center frame section by a plurality of rigid frame members.

5 Claims, 7 Drawing Sheets

STACK-FOLD IMPLEMENT HAVING BULK FILL SYSTEM

BACKGROUND OF THE INVENTION

The present invention relates generally to farm implements and, more particularly, a stack-fold implement having a bulk fill hopper.

Increasingly, farm implements have been designed to have frames that can be folded between field-working and transport positions. One such type of farm implement is a stack-fold planter, such as the 1230 Stackerbar planter from Case New Holland, LLC. Stack-fold planters generally consist of a center frame section and a pair of wing frame sections. In the field-working position, the wing frame sections are evenly aligned with the center frame section. In the transport position, however, the wing sections are lifted to a position directly above the center frame section, i.e., to a "stacked" position. In the stacked position, the width of the implement is generally that of the center frame section, thus making the implement better suited for transport along roads and between crops.

Openers are mounted to the frame sections at equal intervals, with each of the wing sections typically carrying one-half the number of openers mounted to the center frame section. The openers are designed to a cut a furrow into a planting surface, deposit seed and/or fertilizer into the furrow, and then pack the furrow. In this regard, each opener will have a seed box that is manually loaded with seed and/or fertilizer. Since the size of the seed box determines how much particulate matter the box can retain, there is generally a desire to have larger seed boxes for each of the openers. Since the larger seed boxes can hold more material, fewer refilling stops are needed when planting a field.

Larger seed boxes, however, have drawbacks. The additional material that can be carried by larger seed boxes adds to the overall weight of the openers, including those mounted to the wing sections. This additional weight can stress the lifting/lowering system that stacks the wing sections, or require a more robust system, which can add to the overall size, mass, complexity, and cost of the implement. Additionally, larger seed boxes can affect the spacing between adjacent openers, and thus the spacing between seed trenches that are formed by the openers. Larger spacing between seed trenches lower per acre crop yields. Further, it can be problematic and time consuming to individually fill each of the seed boxes, whether using bags or a conveyor system.

SUMMARY OF THE INVENTION

The present invention is directed to a stack-fold implement having a central bulk fill hopper assembly that overcomes the aforementioned drawbacks. The bulk fill hopper assembly is mounted to the center frame section of the stack-fold implement and does not affect the narrowness of the stack-fold implement when it's in a stacked, transport position. The hopper assembly preferably includes a pair of bulk fill hoppers or tanks supported by cradle that which is supported by a pair of wheels. The cradle is removably coupled to the center frame section by a pair of rigid frame members. Parallel linkages are coupled to the cradle and keep the cradle level as the cradle is being moved between raised and lowered positions.

According to one aspect of the invention, an agricultural implement is provided, and includes a tool bar adapted to be coupled to a prime mover, with the tool bar having an inner section and at least one outer section, and a plurality of row units coupled to the inner and outer sections of the tool bar. The implement further includes means for raising the outer section to a stacked position generally above the inner section, and a frame member coupled to and extending rearwardly from the inner section of the tool bar. A bulk fill hopper assembly is supported by the frame member and operative to deliver particulate material to the plurality of row units. At least one wheel supports the frame member and the bulk fill hopper assembly, and at least one parallel linkage, having a first end coupled to the frame member and a second end coupled to the wheel, is provided to to raise and lower the frame member.

In accordance with another aspect of the invention, a stack-fold planter has a tool bar comprised of an inner section and a pair of outer sections. A plurality of row units are mounted to the tool bar, and a central product delivery system is operative to provide particulate product to the plurality of row units. The central product delivery system includes a central bulk fill hopper aft of the plurality of row units. Wheels support the central bulk fill hopper above a field surface and a parallel linkage interconnecting the wheel and the bulk fill hopper.

According to a further aspect of the invention, a planting system is provided. The planting system includes a tractor and a stack-fold planter hitched to the tractor. The stack-fold planter includes a tool bar comprised of an inner section and a pair of outer sections adapted to raised to a transport position above the inner section. A plurality of row units are mounted to the tool bar, and a central product delivery system is operative to provide particulate product to the plurality of row units. The central product delivery system includes a central bulk fill hopper aft of the plurality of row units. A wheel supports the central bulk fill hopper above a field surface, and a parallel linkage interconnects the wheel and the bulk fill hopper.

According to one object of the invention, a more efficient, greater material capacity stack-fold planter is provided.

It is another object of the invention to provide a stack-fold implement having a central bulk fill system.

It is a further object of the invention to provide a central bulk fill system for a stack-fold implement, such as a stack-fold planter.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

In the drawings.

DETAILED DESCRIPTION

Figure 1:
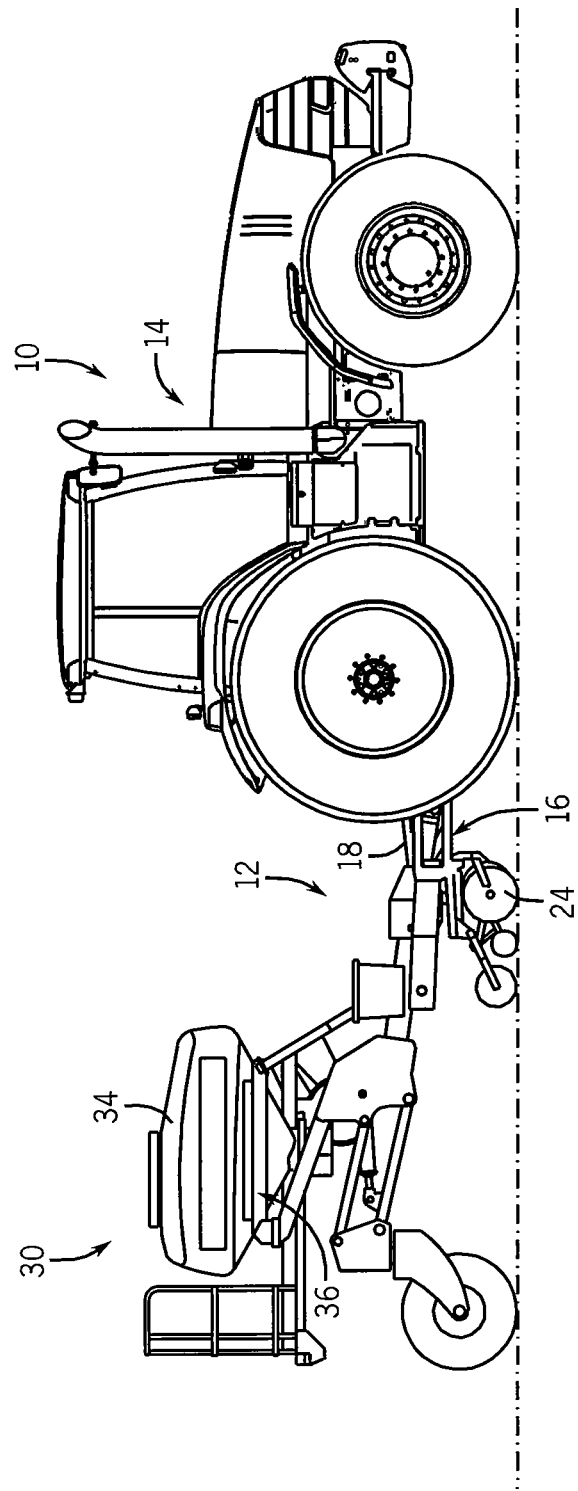
FIG. 1 is a pictorial view of an agricultural planting system comprised of a stack-fold planter coupled to a tractor.
Figure 2:
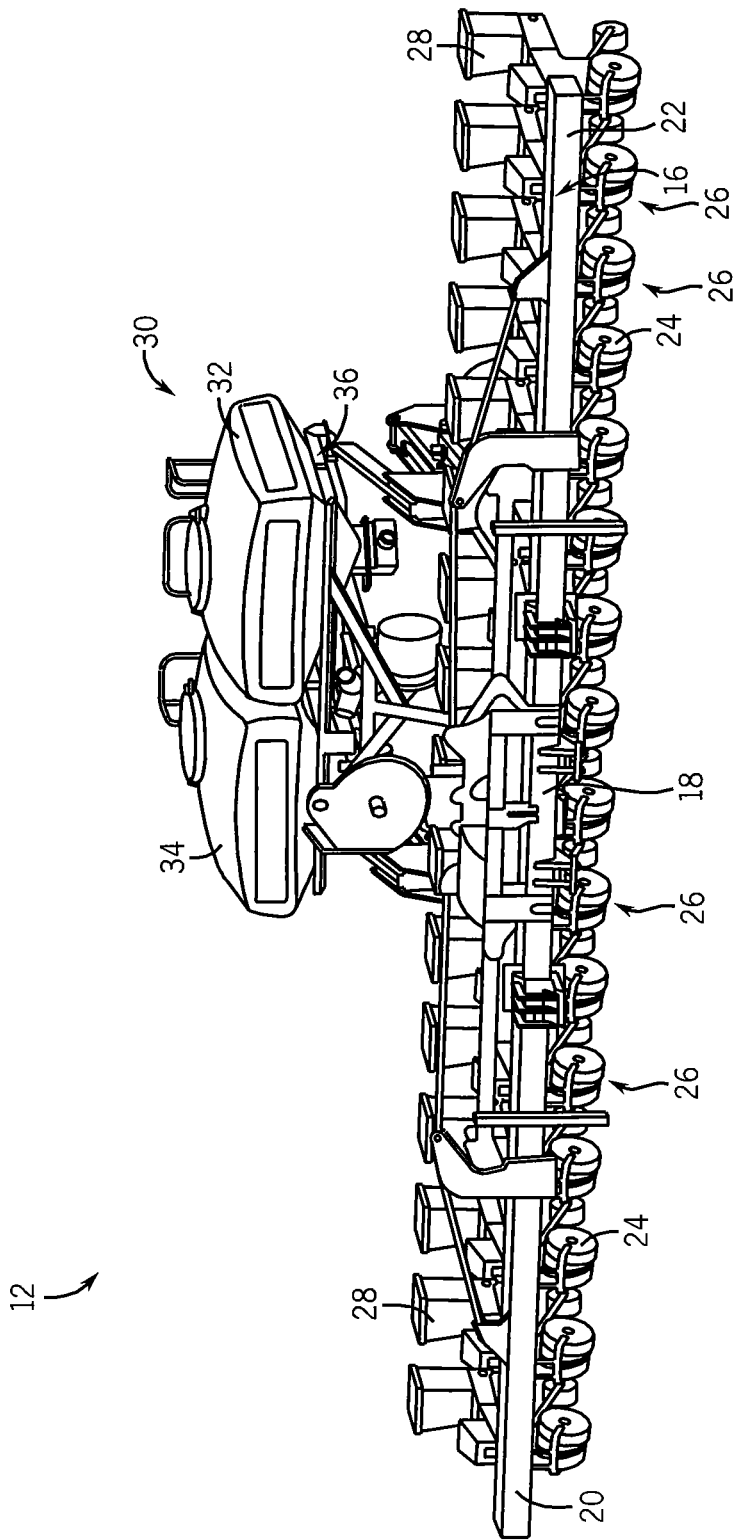
FIG. 2 is an isometric view of the stack-fold planter of FIG. 1 in a field-working position.

Referring now to FIG. 1, a planting system 10 according to one embodiment of the invention includes a stack-fold implement 12, shown in a field working position, coupled to a prime mover 14, e.g., tractor, in a known manner. For purposes of illustration, the stack-fold implement 12 is a row crop planter, which as shown in FIG. 2, includes a frame 16 generally comprised of a center section 18 and wing sections 20, 22 on opposite lateral sides of the center section. The center section 18 includes a tongue (not shown) that extends forwardly of the center section 18 for hitching the implement 12 to the prime mover 14. Gauge wheels 24 on the frame sections 18, 20, and 22 set the seeding or cutting depth for the implement.

Figure 3:
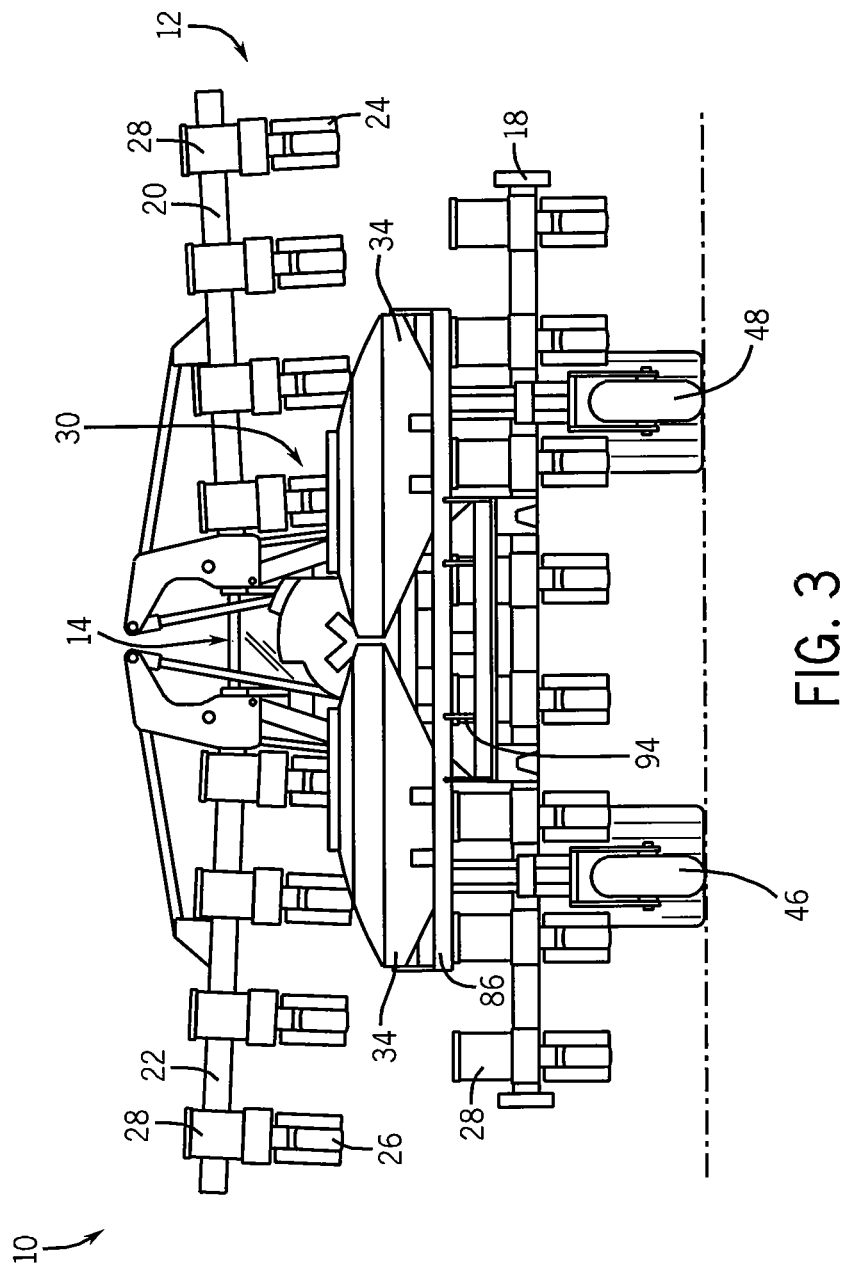
FIG. 3 is a rear elevation view of the stack-fold planter of FIG. 1 in a stacked, transport position.

In the illustrated embodiment, sixteen openers 26 are mounted to the frame 16 at equally spaced intervals, but it is understood that more than or fewer than sixteen openers could be mounted to the frame 16. As known in the art, the wing sections 20, 22 may be raised to a transport position, as shown in FIG. 3, in which the openers carried by the wing sections 20, 22 are stacked over the center section 18. As also known in the art, the openers 26 are designed to cut a furrow into the soil, deposit seed and/or fertilizer into the furrow, and then pack the furrow. Seed boxes or "mini-hoppers" 28 are optionally mounted to each of the openers 26. The mini-hoppers 28 are preferably smaller than conventional mini-hoppers used with stack-fold crop row planters and thus hold less material than conventional seed boxes.

The present invention allows for smaller mini-hoppers as the invention provides for a central bulk fill assembly 30 that delivers material, such as seed and/or fertilizer, to the openers 26 and/or the mini-hoppers 28. The central bulk fill assembly 30 preferably includes a pair of bulk fill hoppers 32 and 34 supported adjacently to one another on a cradle 36. The cradle 36 is supported by a frame 38 that is mounted to the center section 18 by a set of rearwardly extending frame members 40, 42, and 44. In a preferred embodiment, the frame members 40, 42, and 44 are removably coupled to center frame section 18 which allows the bulk fill assembly 30 to be removed from the implement 12 or added as an after-market add-on to an existing stack-fold implement.

The platform 38 is supported above the work surface (or transport surface) by a pair of wheels 46, 48 that are each connected to the platform 40 by respective parallel linkages 50, 52. Each linkage includes an upper link 54, 56 and a lower link 58, 60, respectively. In addition to the links 54-60, a pair of lift arms 62, 64 are provided. Lift arm 62 is coupled to frame member 44 at a knuckle 62 to which parallel linkage 50 is also connected. In a similar manner, lift arm 64 is coupled to frame member 40 at a knuckle 64 to which parallel linkage 52 is also connected. As shown particularly in FIG. 4, the cradle 36 further includes a Y-beam 66 that is pivotally coupled to the center frame member 42. As is customary for most central bulk fill assemblies, an air blower 68 is mounted beneath cradle 36 is operable transfer particulate matter from the hoppers 32, 34 to the individual mini-hoppers 28 or directly to the openers 26 in a forced air stream.

As known in the art, central bulk fill hoppers, such as those described above, provide the convenience of a central fill location rather than having to fill the individual seed boxes. Also, the central fill hoppers have greater capacity than the seed boxes, which reduces the number of fill iterations that must be taken when planting. Simply mounting a central bulk fill assembly to a stack-fold planter, such as planter 12, can create stability issues, especially when the stack-fold planter is in the transport position. In this regard, the present invention provides a mechanism for raising the bulk fill assembly 30 when the stack-fold planter 10 is in the folded, transport position. Raising the bulk assembly 30 provides greater stability during transport as well provides increased clearance between the bulk fill assembly 30 and the roadway.

Figure 5:
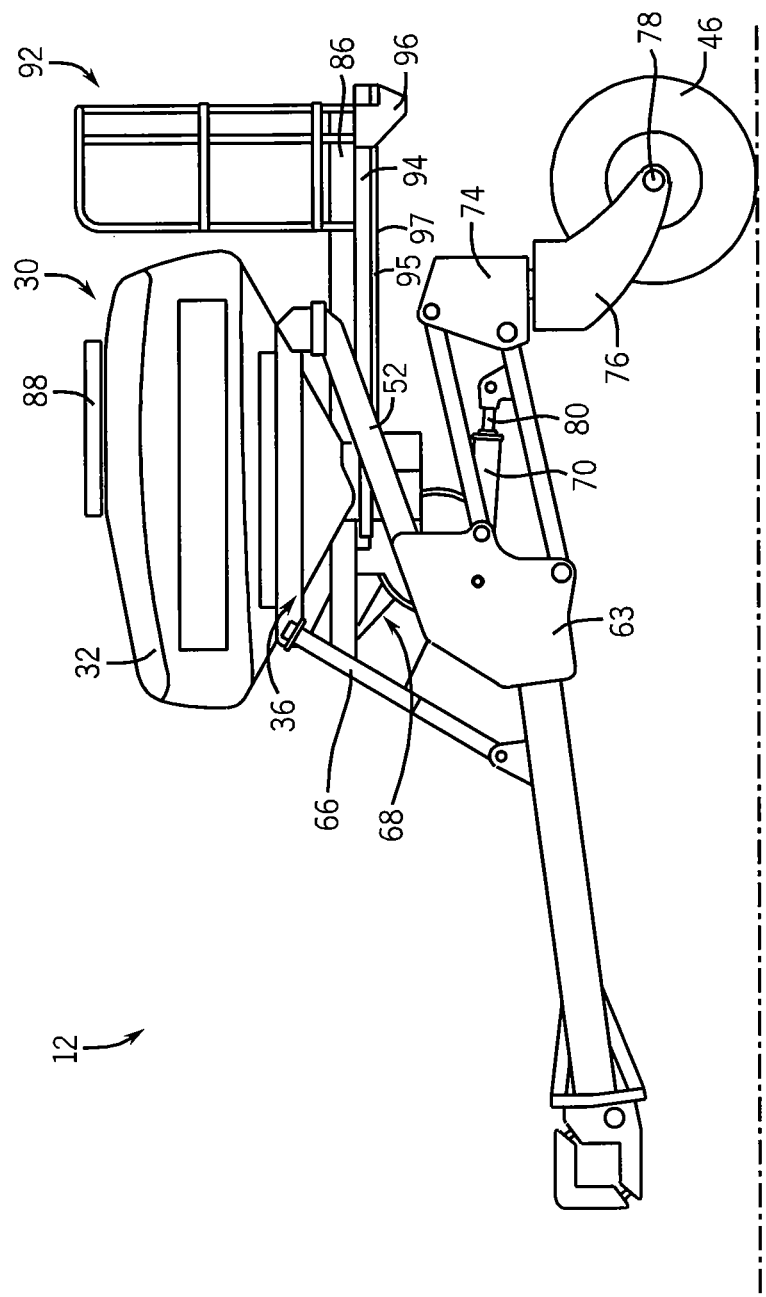
FIG. 5 is a side elevation view of the central bulk fill system of FIG. 4.

Accordingly, the present invention provides a pair of hydraulic lift cylinders 70 and 72 for lifting the cradle 36, and thus the bulk fill assembly 30. Cylinder 70 is interconnected between forward knuckle 62 and a rearward knuckle 74. As shown in FIG. 5, the rearward knuckle 74 includes, or is coupled to, a mounting arm 76 that is coupled to axle 78 about which wheel 46 rotates. Cylinder 70 includes a ram 80 that is coupled to the rearward knuckle 74 whereas cylinder 70 is coupled to the forward knuckle 62. In a similar fashion, cylinder 72 includes a ram (not shown) connected to a rearward knuckle 82 whereas the cylinder 72 is connected to the forward knuckle 64. It will be appreciated that a mounting arm 84 is connected to, or formed with, the rearward knuckle 82, and the mounting arm 84 is connected to an axle (not shown) about which wheel 48 rotates.

Figure 6:
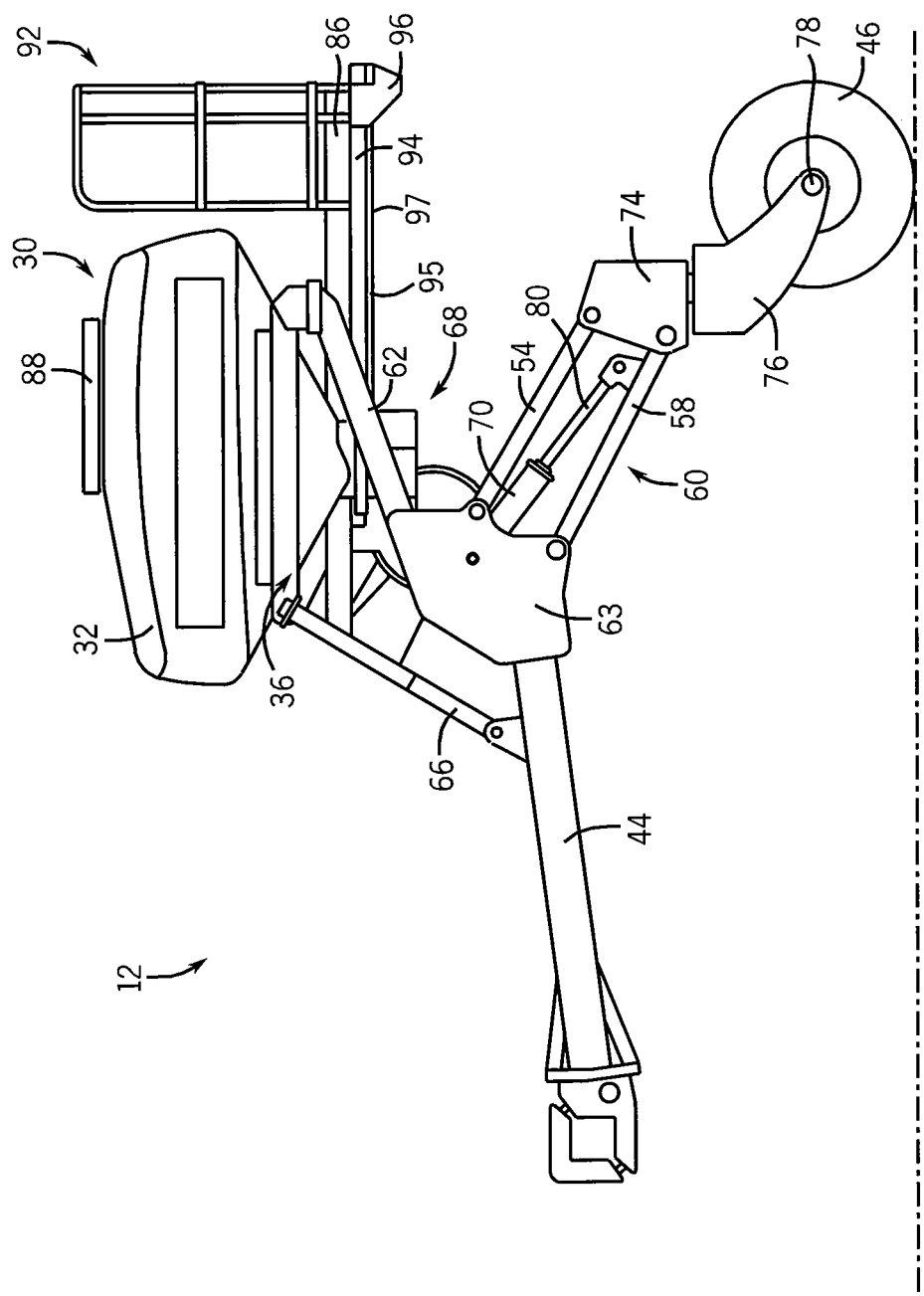
FIG. 6 is a side elevation view of the central bulk fill system in a raised, transport position.

FIG. 6 shows the central bulk fill assembly 30 in the raised-for-transport position. The bulk fill assembly 30 is raised from the lower, field or working position by the actuation of cylinders 70 and 72. In a preferred embodiment, the cylinders 70, 72 are linked to the hydraulic system that raises and lowers the stack-fold planter 12. Thus, the central bulk fill assembly 30 is automatically raised and lowered as the planter 12 is raised and lowered. It is contemplated however that the bulk fill assembly 30 could be raised and lowered independent of the stack-fold planter. Additionally, it is contemplated that a separate hydraulic system could be used to raise and lower the central bulk fill assembly 30.

The following description details how the central bulk fill assembly 30 is raised and lowered. While reference will be made to cylinder 70 and its ram 80, it should be noted that the other cylinder 72 and its ram operate similarly and in-tandem with cylinder 70 and ram 80. In operation, the ram 80 is extended or retracted based on the pressure in cylinder 70. When the ram 80 is extended, the force applied against the rearward knuckle 74 causes the forward knuckle 62 to elevate. Conversely, when the ram is retracted, the forward knuckle 74 is drawn downward resulting in lowering of the central bulk fill assembly 30. It will be appreciated that the parallel linkages 50, 52 maintain the lift arms at a consistent orientation throughout the range of motion provided by extension and retraction of the rams. In this regard, a substantially level central fill bulk assembly 30 is maintained during raising and lowering. Further, as shown by comparing the views of FIGS. 5 and 6, the lift arms 62, 64 remain above the parallel linkages throughout the range of vertical motion of the bulk fill assembly 30.

Figure 4:
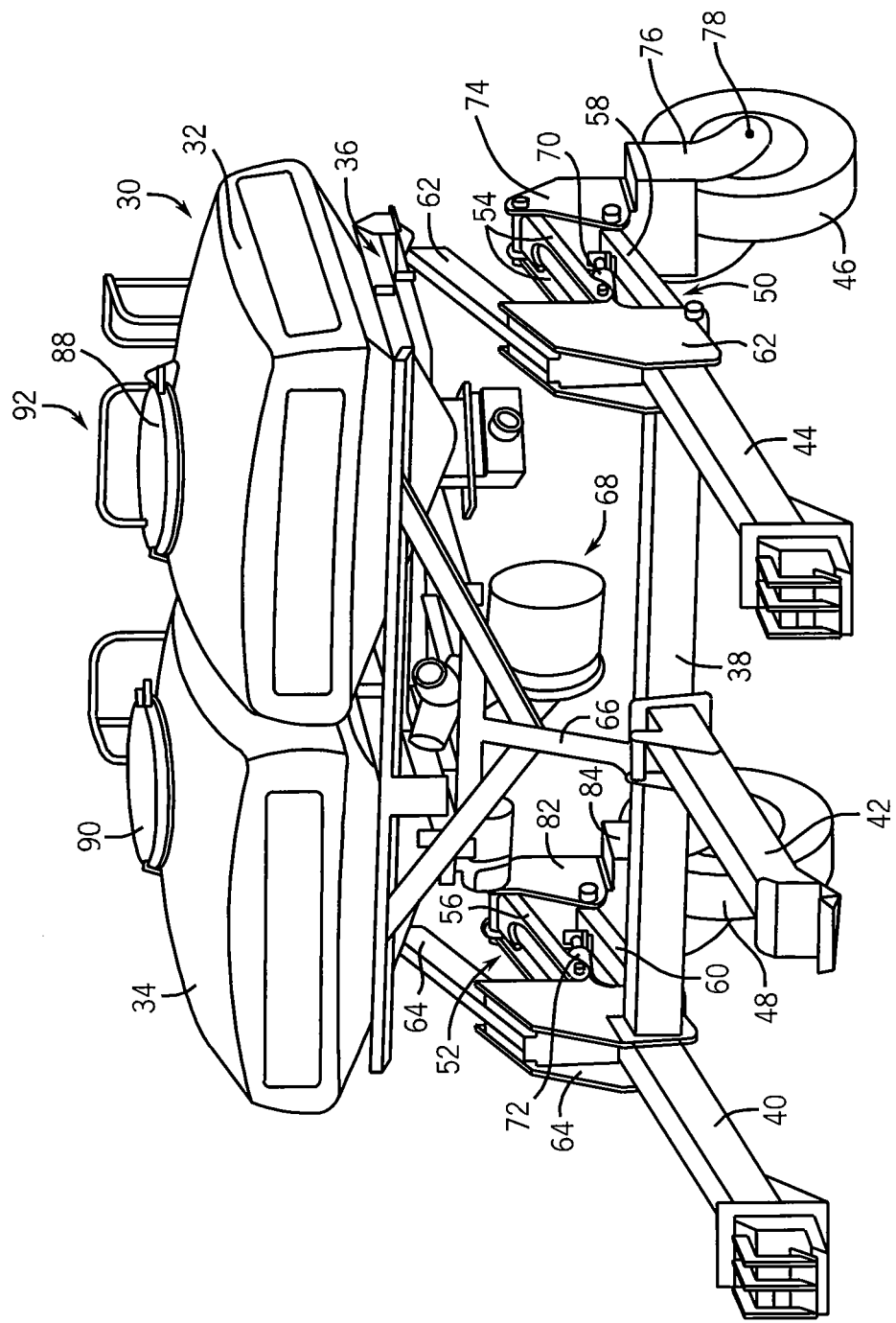
FIG. 4 is an isometric view of the central bulk fill system of FIG. 1 in a lowered, field working position.

Referring now to FIGS. 4 and 5, a platform 86 is mounted to the Y-beam 66 and extends rearward therefrom beneath the bulk fill hoppers 32, 34. The platform 86 provides a standing area for a user to access the respective top hatches 88, 90 for the hoppers 32, 34 for inspecting the fill level of the hoppers 32, 34 or add additional material to the hoppers 32, 34. Extending uprightly generally from a back edge of the platform 86 is a barrier 92 designed to prevent a user from falling off the back edge of the platform 86.

Figure 7:
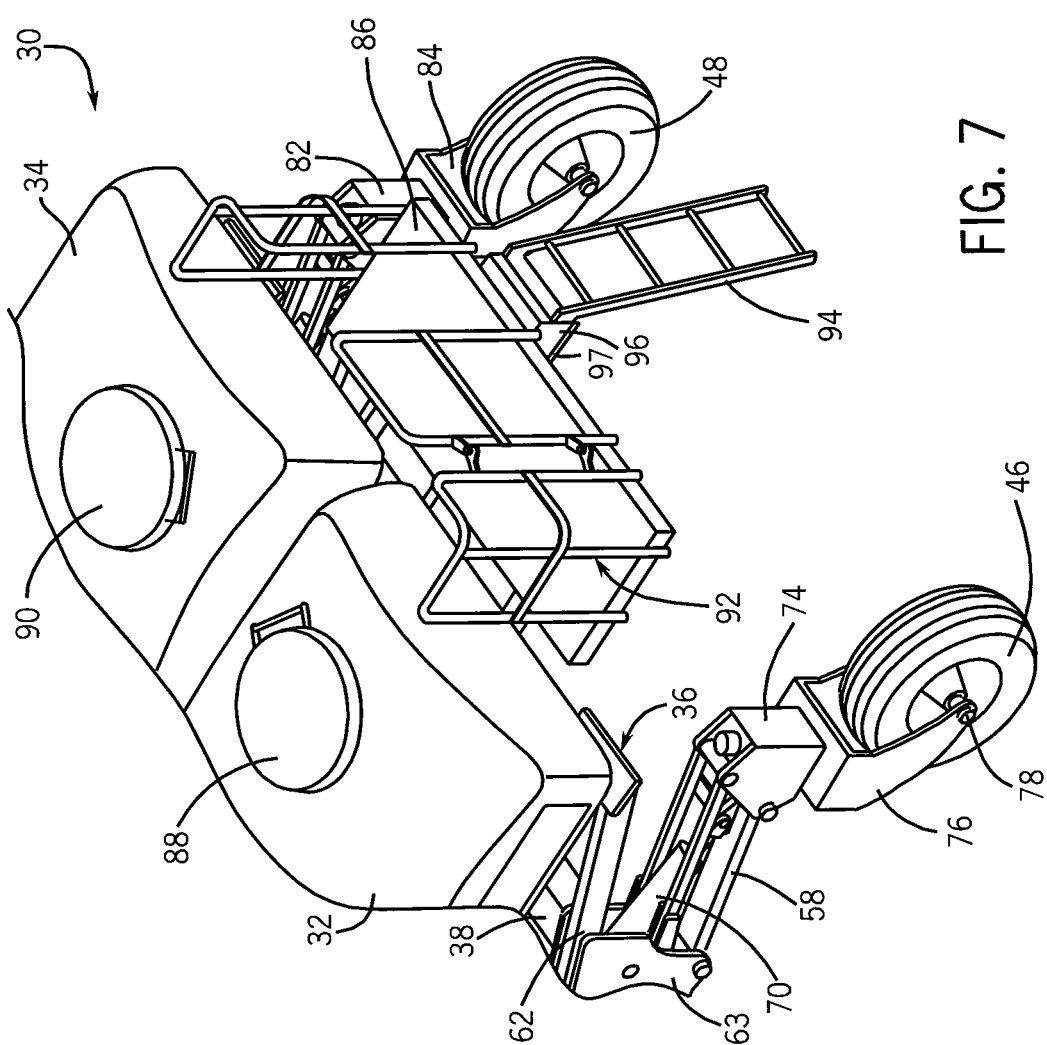
FIG. 7 is a rear isometric view of the central bulk fill system with a stowable ladder in a withdrawn ready-for-use position.

As shown in FIG. 5, even when the bulk fill assembly 30 is in the lowered, field position, the platform is substantially elevated above the field surface. Thus, to provide access to the platform, the present invention provides a stowable ladder 94 that when stowed is retained in a slot 95 formed between the bottom surface of platform 86 and a floor 97 that is mounted below the platform 86. The ladder 94 may be slid rearwardly from the slot 95 and then lowered to a use position, as illustrated in FIG. 7. It will be appreciated that the rearward end of the slot 95 includes catches 96 that retain the forward (top) end of the ladder 94 so that the ladder 94 is not completely removed from the slot 95 when the ladder 94 is moved to the use position. The catches 96 are shaped such that the ladder 94, when it reaches it fully extended position, it may be pivoted or rotated downward so that the trailing (bottom) end engages the ground.

It will be appreciated that the present invention provides a stack-fold implement having a central bulk system and thus the advantages typically associated with bulk fill systems, such as reducing filling intervals, longer planting times, and greater efficiency. Additionally, the centralized hoppers provide the convenience of a central fill location that is generally clear of the openers whether the implement 12 is in a working position or a stacked, transport position. The placement of the bulk fill system rearward of the center section 18 also provides additional stability to the implement 12 when the implement is in the stacked position.

Many changes and modifications could be made to the invention without departing from the spirit thereof. The scope of these changes will become apparent from the appended claims.

I claim:

1. A stack-fold planter comprising:
a center frame section and a pair of outer frame sections mounted to opposite lateral sides of the center frame section, wherein the outer sections are configured to be raised and folded to an over-center stacked position;
a plurality of ground engaging tools mounted to the center frame section and the pair of outer frame sections;
a trailing frame section coupled to and extending rearward from the center frame section;
a pair of lift arms coupled to the trailing frame section, the lift arms having a fixed length;
at least one bulk fill hopper supported by the pair of lift arms; and
a pair of parallel linkages pivotably coupled to the trailing frame section and operative to maintain an orientation of the bulk fill hopper when the lift arms are being raised and lowered, each of the parallel linkages having a fixed length;
a cylinder coupled to the trailing frame section for raising and lowering the lift arms; and
wherein a lowermost position of the pair of lift arms is above an uppermost portion of the pair of parallel linkages throughout a range of motion for the pair of parallel linkages.

2. The planter of claim 1 further comprising a cradle coupled to the pair of lift arms, and wherein the cradle defines a seat for the at least one bulk fill hopper.

3. The planter of claim 2 further comprising a platform coupled to the cradle and extending rearward of the at least one bulk fill hopper.

4. The planter of claim 3 further comprising a ladder coupled to the platform.

5. The planter of claim 4 wherein the ladder is stowable beneath the platform.

* * * * *